United States Patent
Uhm et al.

(10) Patent No.: US 11,714,485 B2
(45) Date of Patent: Aug. 1, 2023

(54) ELECTRONIC DEVICE AND METHOD FOR PROVIDING POSITION OF USER

(71) Applicant: Samsung Electronics Co., Ltd., Suwon-si (KR)

(72) Inventors: Junwhon Uhm, Suwon-si (KR); Jaewon Kim, Suwon-si (KR); Minhyuk Nam, Suwon-si (KR); Yunguk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 17/247,930

(22) Filed: Dec. 30, 2020

(65) Prior Publication Data

US 2021/0200305 A1 Jul. 1, 2021

(30) Foreign Application Priority Data

Dec. 30, 2019 (KR) .......................... 10-2019-0178116

(51) Int. Cl.
*G06F 3/01* (2006.01)
*G06T 7/73* (2017.01)
(Continued)

(52) U.S. Cl.
CPC ................ *G06F 3/012* (2013.01); *G06T 7/73* (2017.01); *H04N 13/117* (2018.05);
(Continued)

(58) Field of Classification Search
USPC ........................................................ 348/135
See application file for complete search history.

(56) References Cited

U.S. PATENT DOCUMENTS

2003/0222809 A1* 12/2003 Nakazawa .............. G01S 13/56
342/28
2011/0228979 A1* 9/2011 Nishino .................. G06T 7/246
382/103
(Continued)

FOREIGN PATENT DOCUMENTS

CN 105229570 B * 6/2018 ............... G06F 1/28
KR 20170044451 A1 4/2017
(Continued)

OTHER PUBLICATIONS

European Patent Office, "Supplementary European Search Report," dated Sep. 23, 2022, in connection with European Patent Application No. 20910835.6, 9 pages.
(Continued)

*Primary Examiner* — Loi H Tran

(57) ABSTRACT

Various embodiments disclose an electronic device including a camera, at least one mmWave antenna module, and at least one processor, wherein the at least one processor is configured to: acquire image information of a surrounding environment via the camera; acquire signal information resulting from a signal emitted from the at least one mmWave antenna module by the surrounding environment; and track a position of the user, based on at least one of the image information acquired via the camera and the signal information acquired via the at least one mmWave antenna module. Various other embodiments derived from the specification are possible.

14 Claims, 10 Drawing Sheets

(51) Int. Cl.
  *H04N 13/344* (2018.01)
  *H04W 4/029* (2018.01)
  *H04N 13/117* (2018.01)
  *H04N 23/57* (2023.01)
  *H01Q 21/00* (2006.01)

(52) U.S. Cl.
  CPC ........... *H04N 13/344* (2018.05); *H04N 23/57* (2023.01); *H04W 4/029* (2018.02); *G06T 2207/30244* (2013.01); *H01Q 21/0025* (2013.01)

(56) References Cited

U.S. PATENT DOCUMENTS

| | | | |
|---|---|---|---|
| 2014/0267021 A1* | 9/2014 | Lee | G06F 3/0304 345/156 |
| 2014/0282224 A1 | 9/2014 | Pedley | |
| 2016/0187652 A1 | 6/2016 | Fujimaki et al. | |
| 2016/0248995 A1 | 8/2016 | Mullins et al. | |
| 2017/0300780 A1* | 10/2017 | Baba | G01S 13/867 |
| 2018/0108179 A1 | 4/2018 | Tomlin et al. | |
| 2018/0144554 A1 | 5/2018 | Watola et al. | |
| 2018/0158203 A1* | 6/2018 | Kanetake | G06V 10/25 |
| 2018/0330154 A1 | 11/2018 | Park et al. | |
| 2020/0019686 A1* | 1/2020 | Min | H04W 12/06 |
| 2020/0200892 A1* | 6/2020 | Rajab | G01S 13/82 |
| 2020/0301146 A1* | 9/2020 | Kim | G02B 27/0179 |
| 2020/0367017 A1* | 11/2020 | Liang | G06F 3/165 |

FOREIGN PATENT DOCUMENTS

| | | |
|---|---|---|
| WO | 2017139871 A1 | 8/2017 |
| WO | 2019039649 A1 | 2/2019 |

OTHER PUBLICATIONS

International Search Report and Written Opinion of the International Searching Authority in connection with International Application No. PCT/KR2020/019316 dated Apr. 26, 2021, 8 pages.

Shun, et al., "Line of Sight Vector Estimation using UWB for Augmented Reality Based Indoor Location Monitoring System", JPNT Journal of Positioning, Navigation, and Timing, Sep. 15, 2016, 12 pages.

* cited by examiner

ELECTRONIC DEVICE AND METHOD FOR PROVIDING POSITION OF USER

CROSS-REFERENCE TO RELATED APPLICATION

This application is based on and claims priority under 35 U.S.C. 119 to Korean Patent Application No. 10-2019-0178116 filed on Dec. 30, 2019 in the Korean Intellectual Property Office, the disclosure of which is herein incorporated by reference in its entirety.

BACKGROUND

1. Field

Various embodiments relate to a wearable device and, more specifically, to an electronic device and a method for providing the position of a user wearing a wearable device.

2. Description of Related Art

Virtual reality (VR) refers to a technology for artificially creating a virtual environment that is similar to an actual environment, but does not exist, by using an electronic device (for example, a computer). An instruction physically entered a computer may create a virtual environment on the computer, and the user may experience the virtual environment in real time through a separate electronic device. Augmented reality (AR) refers to a technology for combining the existing environment with a virtual object or information such that the virtual object or information looks like an object existing in the original environment.

The VR and AR may be typically implemented through a head-mounted display (HMD). The HMD refers to a display device that can be mounted on a user's head part such that images can be presented right in front of his/her eyes.

The user may experience the VR through stereoscopic images. Human eyes are spaced apart by about 6.5 cm, and a disparity thus occurs between the two eyes when viewing a specific target (binocular disparity). This binocular disparity provides humans with stereopsis such as a sense of distance or a sense of depth. This principle may be used to reproduce stereoscopic images, which have been captured at different angles corresponding to those according to the binocular disparity, through both lenses of the HMD such that the user can have stereoscopic experiences difference from those experienced when viewing images through normal displays.

In addition, the user may employ a virtual retinal display scheme to experience the AR. The VRD scheme refers to a display scheme employing a mini-projector and a semi-transparent prism. Data is output through beams from the projector, and the light is reflected by the prism such that the same is directly focused on the user's retinas. Since images are directly created on the user's retinas, the user can experience the AR without focusing his/her eyes on the displays. The VRD scheme is applied to HMD devices for AR.

To implement the VR and AR, a position tracking technology is necessary to track the user's position. Currently, multiple cameras for implementing the position tracking technology are mounted on an electronic device (for example, HMD) separately from an RGB camera for recording images of the peripheral environment.

Meanwhile, the VR and AR have initially been marketed mainly in entertainment industries related to games and images, but recent growth thereof together with related technologies and accelerated convergence between industries have materialized application thereof to various industries (for example, health care, education, shopping, and manufacturing).

The above information is presented as background information only to assist with an understanding of the disclosure.

SUMMARY

A user needs to wear an electronic device to continuously experience the VR and AR. This has a problem in that the longer the user experiences the same, the less the user feels immersed due to the weight of the electronic device. As such, there is a need to reduce the weight of the electronic device.

Currently, multiple cameras are mounted for position tracking of the device, and constant use of such multiple cameras increases current consumption. Increased current consumption reduces the available time of the electronic device, and the battery capacity needs to be increased as a countermeasure. Increased battery capacity of the electronic device is synonymous with increased weight of the electronic device.

In addition, in connection with implementation of tracking technology through cameras, if the space in which the VR and AR are experienced is an environment such as a dark room, for example, position tracking through image analysis is difficult because enough illuminance fails to be secured. In addition, even if the space has sufficient illuminance, position tracking through image analysis may prove to be difficult if the peripheral environment is made up of monochromic patternless walls.

Therefore, various embodiments seek to use an antenna that performs wireless communication, in addition to cameras, in order to efficiently implement position tracking in connection with the VR and AR.

An electronic device according to an embodiment may include: a camera; at least one mmWave antenna module configured to perform wireless communication by using an mmWave signal; and at least one processor. The at least one processor may be configured to: acquire image information of a surrounding environment via the camera; acquire signal information resulting from reflection of a signal emitted from the at least one mmWave antenna module by the surrounding environment; and track a position of the user, based on at least one of the image information acquired via the camera and the signal information acquired via the at least one mmWave antenna module.

An operation method of an electronic device according to an embodiment may include the operations of: acquiring image information of a surrounding environment via a camera; acquiring signal information resulting from reflection of a signal emitted from at least one mmWave antenna module by the surrounding environment; and tracking a position of a user, based on at least one of the image information acquired via the camera and the signal information acquired via the at least one mmWave antenna module.

An electronic device and a method according to various embodiments may advantageously provide the position of a wearable device user in various environments.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the description below, an electronic device is a wearable electronic device, and may include a head-mounted display (HMD) device, which is worn on a user's head and is moved by the movement of the head, an audio output device (e.g., a headphone, an earphone, etc.), smart glasses, etc.

Figure 1A:
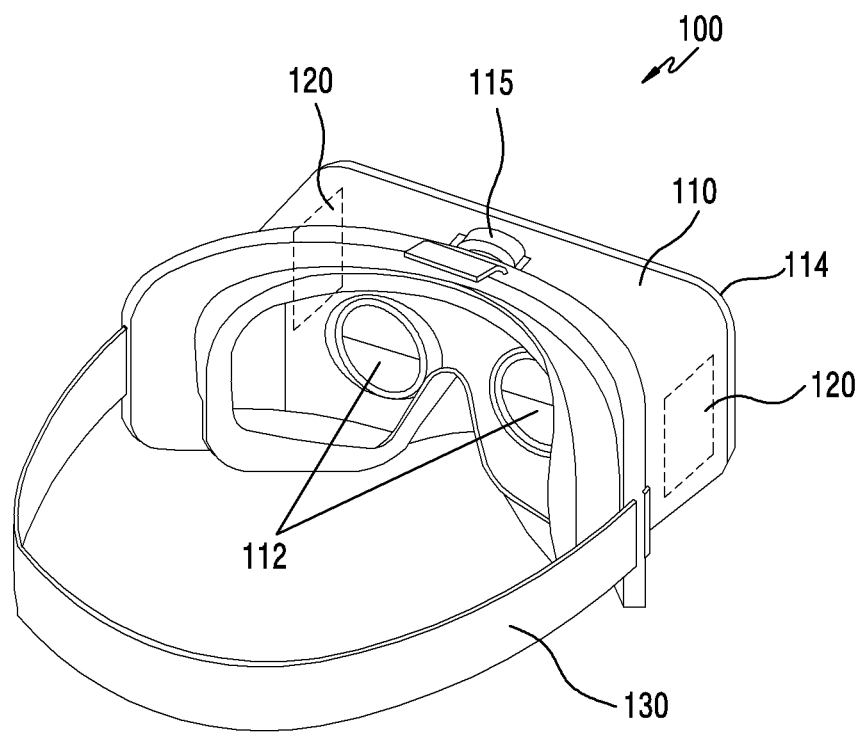
FIG. 1A illustrates a perspective view of a wearable electronic device according to one embodiment.

FIG. 1A illustrates a perspective view of a wearable electronic device according to one embodiment.

Referring to FIG. 1A, a wearable electronic device 100 may include: a body 110; and a connection part (a strap) 130, connected to the body 110 so as to fix the wearable electronic device 100 to a portion of a human body (e.g., the head, etc.).

In one embodiment, the body 110 may include display 114 provided at the front surface thereof. In one embodiment, a lens part 112 may be disposed at the display 114 of the body 110, and a user may watch an image displayed on the display 114 via the lens part 112. In one embodiment, the display 114 may display different respective images through a left lens and a right lens of the lens part 112. For example, in the display 114, the display 114 viewed via the left lens of the lens part 112 may display a left-eye image which is to be transferred to the left eye of a user, and the display 114 viewed via the right lens of the lens part 112 may display a right-eye image which is to be transferred to the right eye of the user. The display 114 may display a left-eye image and a right-eye image that are different from each other to allow a user to feel a sense of three dimensions. Thus, the wearable electronic device 100 may implement virtual reality in a three-dimensional space.

In one embodiment, the wearable electronic device 100 may clearly adjust an image displayed on the display 114 by using a focus adjustment module 115, and may then provide the image to a user.

In one embodiment, the wearable electronic device 100 may include an antenna module 120 provided in each of the side surfaces of the body 110. In one embodiment, the user who wears the wearable electronic device 100 may transmit and receive data to and from an external device via the antenna module 120. For example, the antenna module 120 may receive, from an external device, a content to be provided to the user of the wearable electronic device 100. Further, the antenna module 120 may transmit information about a user's motion to the external device such that the content reflects the user's motion.

Figure 1B:
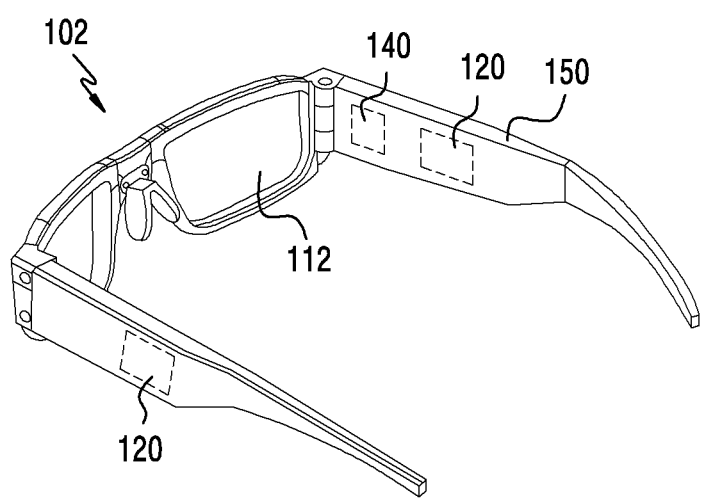
FIG. 1B illustrates a perspective view of a wearable electronic device according to another embodiment.

FIG. 1B illustrates a perspective view of a wearable electronic device according to another embodiment.

Referring to FIG. 1B, a wearable electronic device 102, which is smart glasses resembling eyeglasses in shape, and may include a lens part 112 and a temple 150.

In one embodiment, the temple 150 of the wearable electronic device 102 may include an antenna module 120, a projector 140, and a prism (not shown). In one embodiment, the projector 140 may emit beams including data toward the prism (not shown), and beams refracted from the prism may be displayed on the lens part 112.

In one embodiment, the projector 140 may output data acquired through the antenna module 120. In one embodiment, a user wearing the wearable electronic device 102 may identify an actual environment and data information emitted by the projector 140 together via the lens part 112. Thus, the wearable electronic device 102 may implement augmented reality (AR) based on an actual environment.

Figure 2:
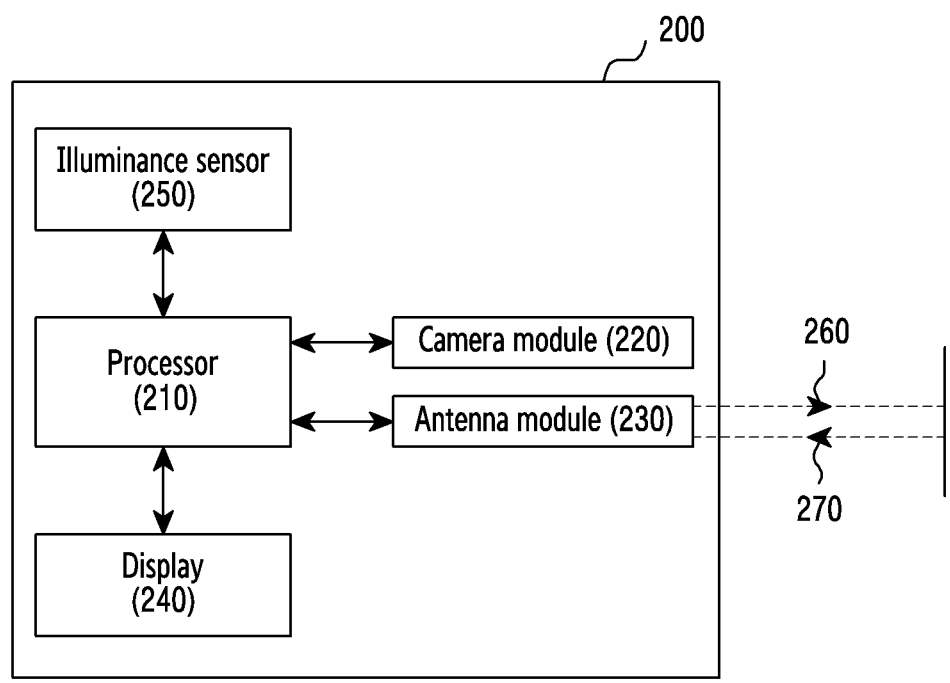
FIG. 2 illustrates a block diagram of an electronic device according to at least one embodiment.

FIG. 2 illustrates a block diagram of an electronic device according to one embodiment.

Referring to FIG. 2, an electronic device 200 may include: a processor 210; a camera module 220; an antenna module 230; a display 240; and an illuminance sensor 250. The electronic device 200 in FIG. 2 may correspond to the wearable electronic device 100 or the wearable electronic device 102 illustrated in FIGS. 1A and 1B. Therefore, a description that is identical to, corresponds to, or similar to the descriptions made with reference to FIGS. 1A and 1B will be omitted. If the electronic device 200 corresponds to the wearable electronic device 102, the display 240 may be considered as the lens part 112 of the wearable electronic device 102.

In one embodiment, the camera module 220 may capture a still image and a moving image of a surrounding environment. In one embodiment, the camera module 220 may capture a still image and/or a moving image of a change in the surrounding environment according to a user's motion, and may track the position of the electronic device 200, based on the still image and/or the moving image.

In one embodiment, the antenna module 230 may transmit or receive signals to or from the outside (e.g., an external electronic device). In one embodiment, the electronic device 200 may include a transceiver for controlling the antenna module 230 and processing signals. In one embodiment, the antenna module 230 may emit a transmission signal 260 to the outside, and may receive a reflected signal 270 reflected by an external object. The antenna module 230 may perform a tracking function of the electronic device 200 based on the reflected signal 270, in addition to performing a communication function. In one embodiment, the antenna module 230 may include an mmWave antenna module which uses a frequency band of 60 GHz. In one embodiment, the antenna module 230 is embodied in an array form, and thus may concentratedly transmit signals in a specific direction through a beamforming technique.

In one embodiment, the display 240 may display data that the antenna module 230 has received from an external device. Further, the display 240 may display data that reflects a user's motion tracked by the antenna module 230.

In one embodiment, the illuminance sensor 250 may measure the brightness of a surrounding environment of the electronic device 200 to output an illuminance value. For example, when a user uses the electronic device 200 in a bright environment having high illuminance, the resistance value of the illuminance sensor 250 is decreased, and the illuminance sensor 250 may output an illuminance value reflecting the decreased resistance value. On the other hand, when a user uses the electronic device 200 in a dark environment having low illuminance, the resistance value of the illuminance sensor 250 is increased, and the illuminance sensor 250 may output an illuminance value reflecting the increased resistance value.

In one embodiment, the processor 210 may calculate a delay time or a decreased signal intensity between transmission and reception by using the transmission signal 260 and the reflected signal 270 that have been emitted and received by the antenna module 230. In one embodiment, the processor 210 may calculate the distance between the electronic device 200 and a reflection point (e.g., a wall, an object, etc.) by using the delay time or the decreased signal intensity between transmission and reception.

Figure 3:
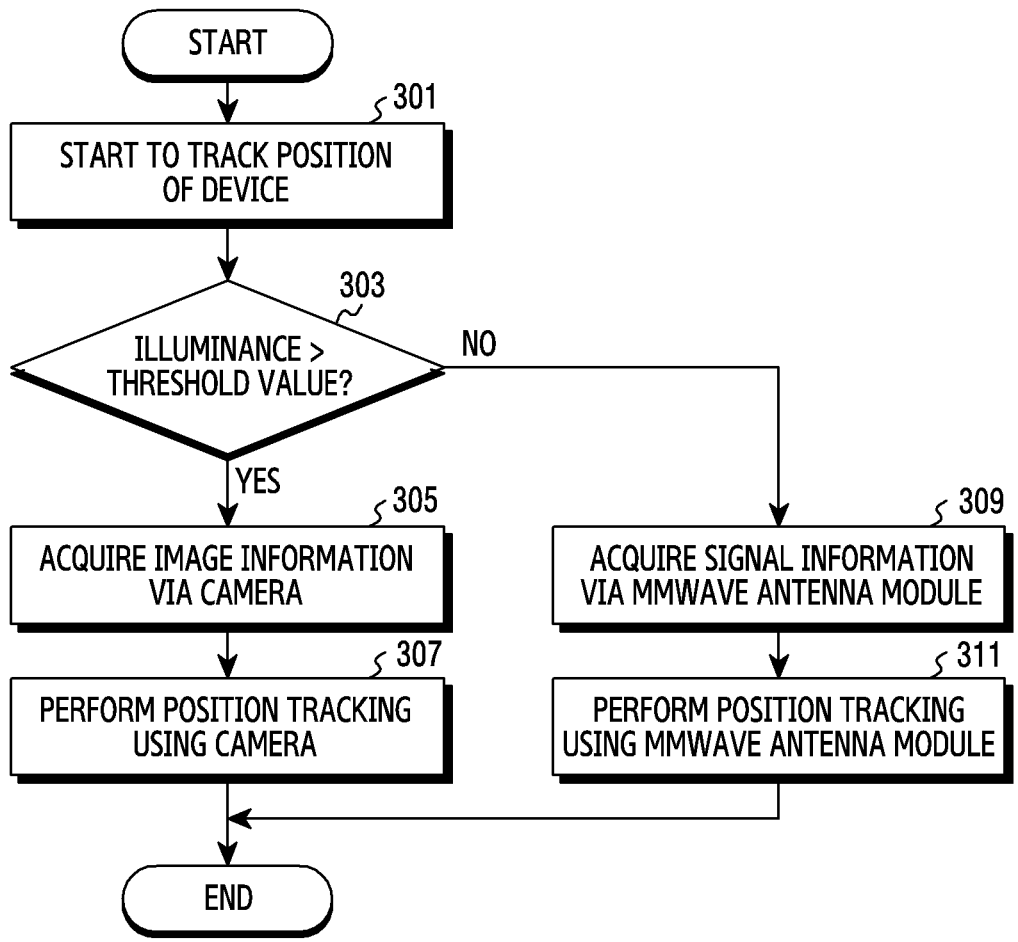
FIG. 3 illustrates a flowchart showing selection of a method for tracking the position of a user according to an illuminance value by an electronic device according to at least one embodiment.

FIG. 3 illustrates a flowchart showing selection of a method for tracking the position of a user according to an illuminance value by an electronic device, according to one embodiment.

Referring to FIG. 3, in operation 301, an electronic device (e.g., the electronic device 200 in FIG. 2) may start to track the position of the electronic device 200. In one embodiment, the electronic device 200 may determine whether a user is wearing the electronic device 200, and may initiate position tracking only when it is determined that the electronic device 200 is being worn by the user.

In one embodiment, in operation 303, the electronic device 200 may determine whether an illuminance value exceeds a threshold value. In one embodiment, an illuminance sensor (e.g., the illuminance sensor 250 in FIG. 2) may measure the brightness of the environment surrounding a user wearing the electronic device and output an illuminance value based thereon. In one embodiment, a processor (e.g., the processor 210 in FIG. 2) may determine whether the illuminance value output by the illuminance sensor 250 exceeds a threshold value.

As a result of performing operation 303, when the illuminance value exceeds the threshold value, the processor 210 may acquire image information via a camera in operation 305.

In one embodiment, in operation 307, the processor 210 may perform position tracking using the acquired image information.

As a result of performing operation 303, if the illuminance value is equal to or less than the threshold value, the processor 210 may acquire signal information via an mmWave antenna module in operation 309. For example, the processor 210 may acquire the reception signal 270 received by the antenna module 230.

In one embodiment, in operation 311, the processor 210 may perform position tracking using the acquired traffic-light information. For example, the processor 210 may determine, based on the reception signal 270, the current position of the electronic device 200 and a change thereof with respect to a surrounding environment, such as a wall or an object.

In an embodiment of FIG. 3, the camera and the antenna module may complement each other in position tracking. For example, when an illuminance value sensed by the illuminance sensor is below a threshold value, position tracking is performed based on position information acquired by the antenna module 230, and position information analyzed by the camera may be used to complement the position tracking. On the other hand, when the illuminance value sensed by the illuminance sensor is sufficiently high, the electronic device 200 may perform position tracking based on the position information analyzed by the camera, and position information acquired by the antenna module 230 may complement the position tracking. In one embodiment, the electronic device 200 may set an error of a designated range (e.g., 10%) based on a position that becomes a reference, and may determine a final position, based on position information for complement within the designated range.

Figure 4B:
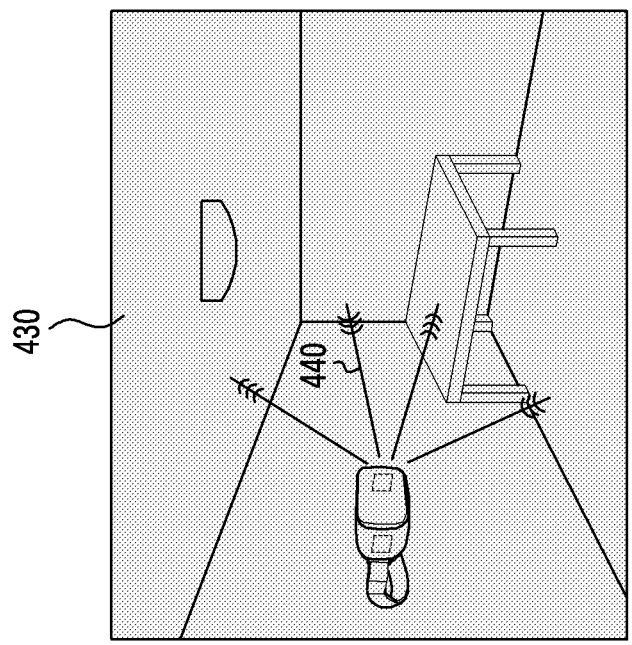
FIG. 4B illustrates a state in which an electronic device according to at least one embodiment tracks the position of the electronic device, based on illuminance in a usage environment.
Figure 4A:
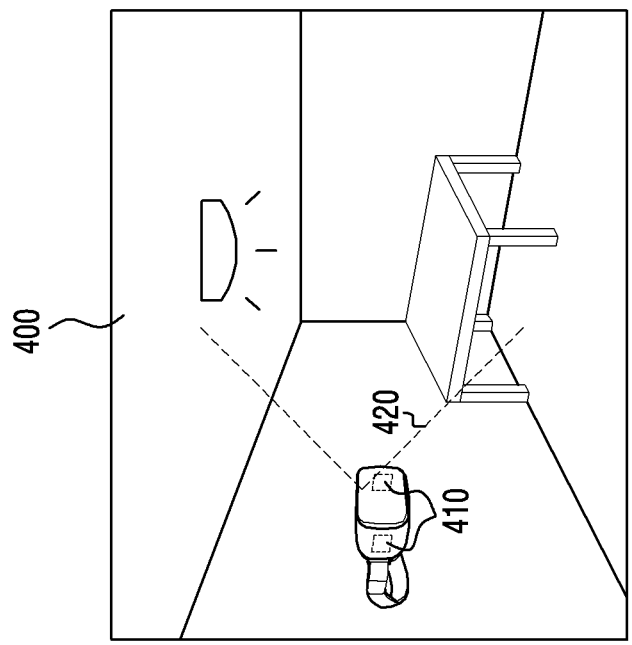
FIG. 4A illustrates a state in which an electronic device according to at least one embodiment tracks the position of the electronic device, based on illuminance in a usage environment.

FIG. 4A illustrates a state in which an electronic device, according to one embodiment, tracks the position of the electronic device, based on illuminance in a usage environment; and FIG. 4B illustrates a state in which an electronic device, according to one embodiment, tracks the position of the electronic device, based on illuminance in a usage environment.

FIG. 4A illustrates the state of tracking the position of an electronic device in an environment in which an illuminance value exceeds a threshold value.

Referring to FIG. 4A, an electronic device (e.g., the electronic device 200 in FIG. 2) may include at least one mmWave antenna module 410 and a camera (not shown). In one embodiment, when the electronic device 200 operates in a bright environment 400 in which illuminance is high, a processor (e.g., the processor 210 in FIG. 2) may determine that a measurement value output from an illuminance sensor exceeds a predetermined threshold value. In one embodiment, the processor 210 may acquire image information 420 of the surrounding environment 400 via the camera (not shown). In one embodiment, the processor 210 may track the position of the electronic device 200 by using the image information 420 of the surrounding environment 400. In one embodiment, the at least one mmWave antenna module 410 may complement the position tracking by the camera (not shown) in a high-illuminance environment.

FIG. 4B illustrates the state of tracking the position of an electronic device in an environment in which an illuminance value is equal to or less than a threshold value.

Referring to FIG. 4B, when the electronic device 200 operates in a dark environment 430 in which illuminance is low, the processor 210 may determine that a measurement value output from the illuminance sensor is equal to or less than the predetermined threshold value. In one embodiment, the processor 210 may acquire signal information 440 of the surrounding environment 430 via the at least one mmWave antenna module 410. In one embodiment, the processor 210 may track the position of the electronic device 200 by using the signal information 440 of the surrounding environment 430. In one embodiment, the camera (not shown) may complement the position tracking using the at least one mmWave antenna module 410 in a low-illuminance environment.

Figure 5:
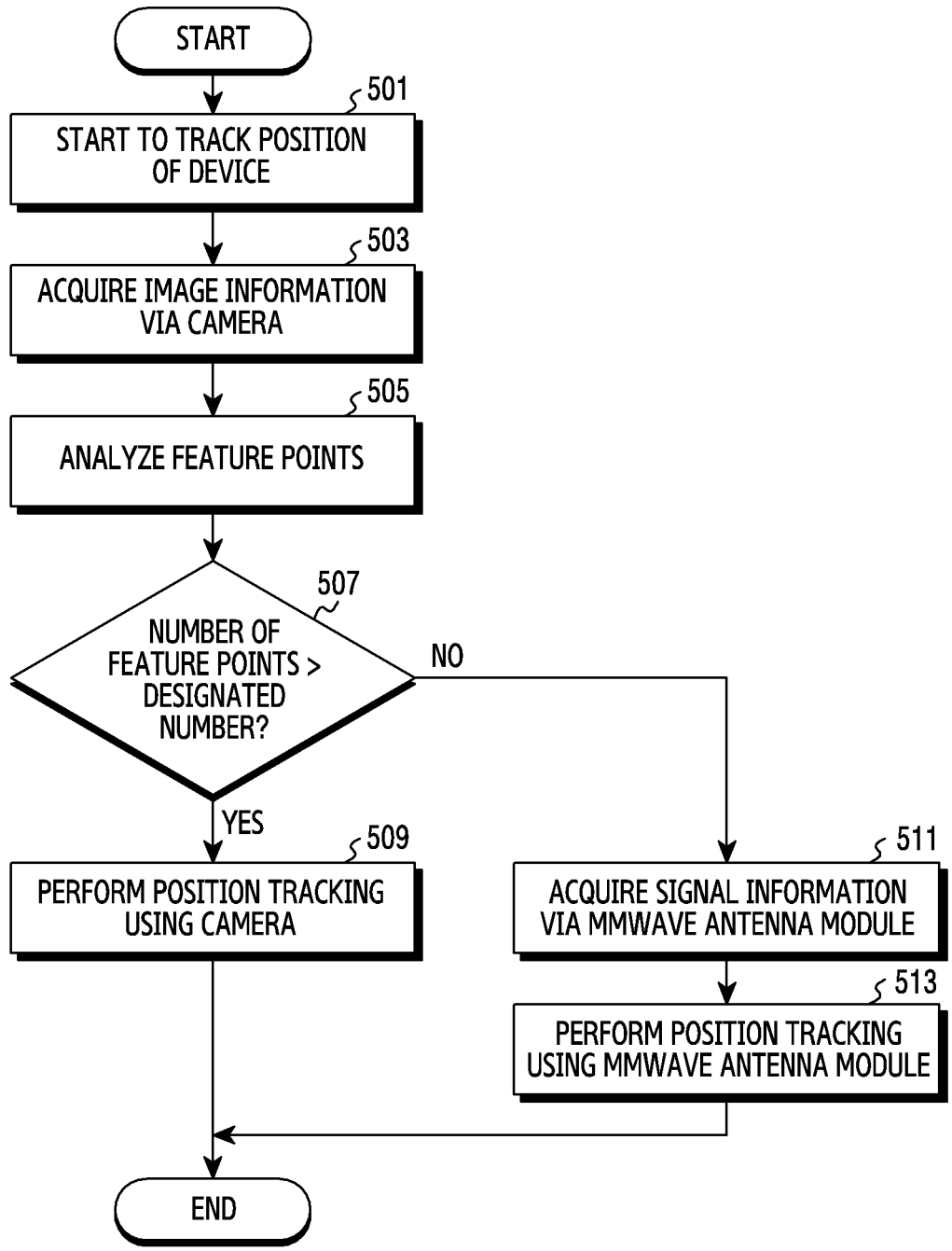
FIG. 5 illustrates a flowchart showing selection of a method for tracking the position of a user according to the number of feature points by an electronic device according to at least one embodiment.

FIG. 5 illustrates a flowchart showing selection of a method for tracking the position of a user according to the number of feature points by an electronic device, according to one embodiment. In relation to FIG. 5, a description that corresponds to, is identical to, or is similar to the above description will be omitted.

Referring to FIG. 5, in operation 501, an electronic device (e.g., the electronic device 200 in FIG. 2) may start to track the position of the electronic device 200.

In one embodiment, in operation 503, the electronic device 200 may acquire image information of a surrounding environment via a camera. In one embodiment, when whether a user wears the electronic device 200 is determined, a processor (e.g., the processor 210 in FIG. 2) may acquire image information by capturing an image of a surrounding environment of the user by means of the camera.

In one embodiment, in operation 505, the electronic device 200 may analyze feature points in the image information. In one embodiment, the processor 210 may analyze the acquired image information so as to extract multiple feature points. For example, the processor 210 may extract feature points based on angles or corners of an object present in the image information. In one embodiment, when a user operates the electronic device 200 outdoors rather than indoors, the processor 210 may extract feature points based on angles or corners of structures such as buildings and trees which are present outdoors.

In one embodiment, in operation 507, the electronic device 200 may determine whether the number of the extracted feature points exceeds a designated number. In one embodiment, the processor 210 may preset the number of feature points that are necessary for tracking the position of a user.

As a result of performing operation 507, when the number of the extracted feature points is equal to or greater than the designated number, the processor 210 may maintain the image information acquisition via the camera in operation 509. The processor 210 may perform position tracking using the acquired image information.

As a result of performing operation 507, when the number of the extracted feature points is less than the designated number, the processor 210 may acquire traffic-light information via an mmWave antenna module in operation 511. In one embodiment, in operation 513, the processor 210 may perform position tracking using the acquired signal information.

Figure 6B:
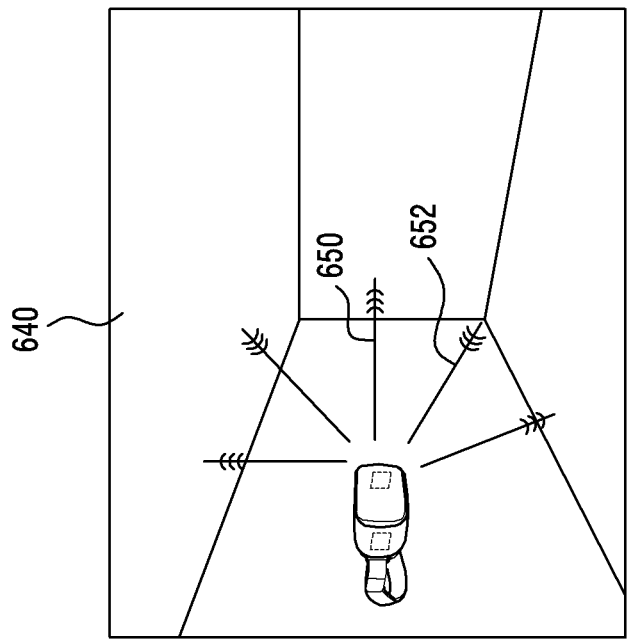
FIG. 6B illustrates the state in which an electronic device according to at least one embodiment tracks the position of the electronic device, based on the number of feature points in a usage environment.
Figure 6A:
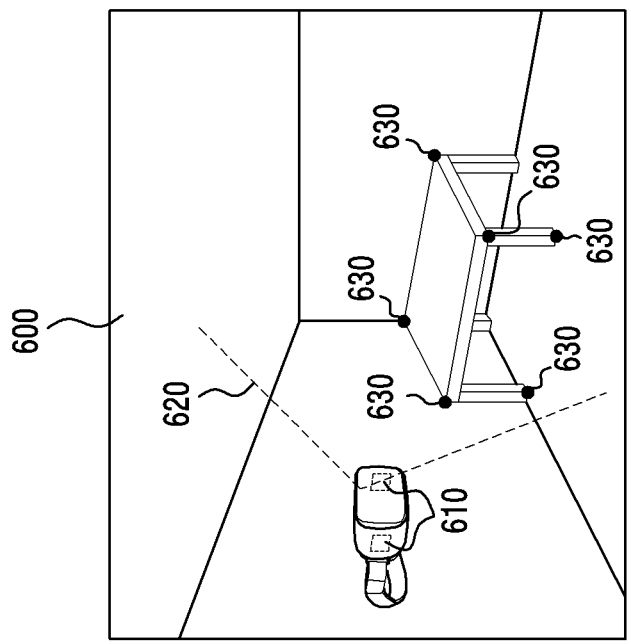
FIG. 6A illustrates a state in which an electronic device according to at least one embodiment tracks the position of the electronic device, based on the number of feature points in a usage environment.

FIG. 6A illustrates a state in which an electronic device, according to one embodiment, tracks the position of the electronic device, based on the number of feature points in a usage environment; and FIG. 6B illustrates a state in which an electronic device, according to one embodiment, tracks the position of the electronic device, based on the number of feature points in a usage environment. In relation to FIGS. 6A and 6B, a description that corresponds to, is identical to, or is similar to the above description will be omitted.

FIG. 6A illustrates the state of tracking the position of an electronic device in an environment in which the number of feature points is equal to or greater than a designated number.

Referring to FIG. 6A, an electronic device (e.g., the electronic device 200 in FIG. 2) may include: at least one mmWave antenna module 610; and a camera (not shown). In one embodiment, when it is determined that the electronic device 200 is being worn by a user, the electronic device 200 may acquire image information 620 by capturing an image of a surrounding environment of the user by means of the camera (not shown). In one embodiment, when the electronic device 200 operates in an environment 600 which includes elements recognizable as feature points 630, a processor (e.g., the processor 210 in FIG. 2) may analyze the number of the feature points 630 in the image information 620 acquired from the camera (not shown). In one embodiment, the elements recognizable as the feature points 630 may include angles or corners of an indoor object, patterns on wallpaper, etc. In one embodiment, elements that can be recognized as the feature points 630 when the electronic device 200 operates outdoors may include corners of a building, a structure, a tree, etc. In one embodiment, when the number of the feature points 630 is equal to or greater than the designated number, the processor 210 may track the position of the electronic device 200, based on the image information 620 acquired via the camera (not shown). For example, the processor 210 may set the number of feature points necessary for position tracking using the camera (not shown) to n (e.g., five). When the number of feature points that are present in an environment in which the electronic device 200 is operating is greater than n (e.g., when the number is six), the number of feature points exceeds the designated number, and thus position tracking may be performed using the camera (not shown). In one embodiment, the at least one antenna module 610 may complement the position tracking by the camera.

FIG. 6B illustrates the state of tracking the position of an electronic device in an environment in which the number of feature points is less than the designated number.

Referring to FIG. 6B, when the electronic device 200 operates in an environment 640 that does not sufficiently include elements recognizable as feature points, the processor 210 may determine that the number of feature points is less than the designated number. In one embodiment, the environment that does not sufficiently include elements recognizable as feature points may include an empty room in which no object is placed, a space in which wallpaper has a single color and a plain pattern, etc. In one embodiment, when the number of feature points is less than the designated number, the processor 210 may calculate a delay time or a decreased signal intensity between a transmission signal and a reflected signal, and may measure a distance based thereon. In one embodiment, the position of the electronic device 200 with respect to a surrounding environment may be tracked by calculating the measured distance. For example, in the case in which the processor 210 has set the required number of feature points to n (e.g., five), when the number of feature points that are present in an environment in which the electronic device 200 is operating is less than n (e.g., when the number is zero), the number of feature points is less than the designated number, and thus the processor 210 may perform position tracking by using the at least one mmWave antenna module 610. In one embodiment, the camera (not shown) may complement the position tracking by the at least one antenna module 610.

Figure 7:
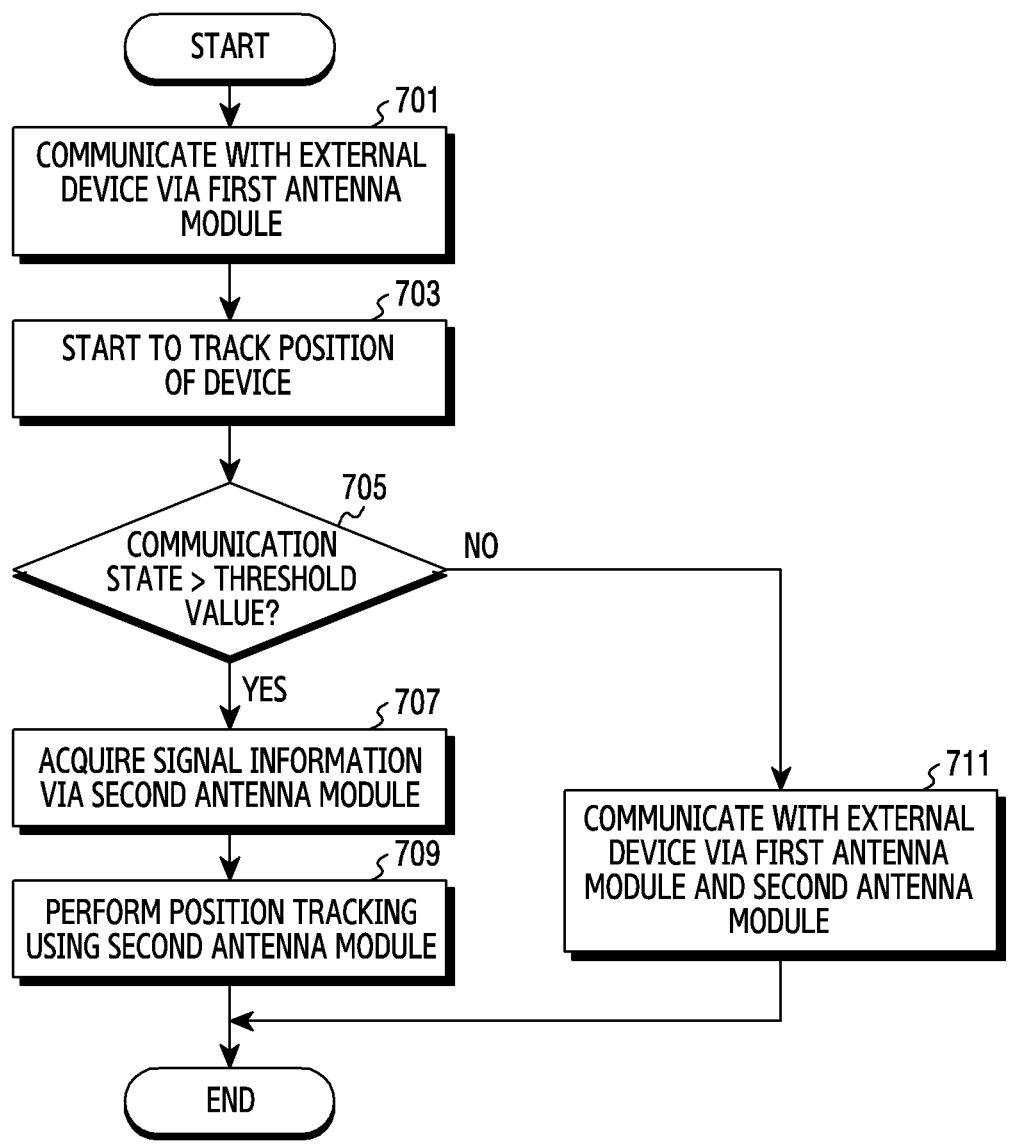
FIG. 7 illustrates an example process for determining whether to perform position tracking using another mmWave antenna module, according to at least one embodiment.

FIG. 7 illustrates a flowchart by which, when communication with an external electronic device is performed via an mmWave antenna module, an electronic device, according to one embodiment, determines, based on the state of the communication, whether to perform position tracking using another mmWave antenna module. In relation to FIG. 7, a description that corresponds to, is identical to, or is similar to the above description will be omitted.

Referring to FIG. 7, in operation 701, an electronic device (e.g., the electronic device 200 in FIG. 2) may communicate with an external device via a first antenna module among one or more mmWave antenna modules. In one embodiment, the first antenna module may communicate with the external device to transmit and receive data, necessary for operating the electronic device 200, to and from the external device. In one embodiment, through communication with the external device, the data may be stored in the electronic device 200 and may be output. In one embodiment, the data may be output in a streaming manner in which the data is transmitted and received in real time while the electronic device 200 communicates with the external device.

In one embodiment, in operation 703, the electronic device 200 may start to track the position of the electronic device 200.

In one embodiment, in operation 705, the electronic device 200 may determine whether the state of the communication via the first antenna module exceeds a threshold value. In one embodiment, the electronic device 200 may determine the communication state, based on a received signal strength index (RSSI) value which is the intensity of a signal received by the electronic device. In one embodiment, the electronic device 200 may determine the communication state, based on the intensity of a Wi-Fi signal that the electronic device 200 receives from an access point (AP).

As a result of performing operation 705, when a signal intensity indicating the state of the communication via the first antenna module exceeds the threshold value, a processor (e.g., the processor 210 in FIG. 2) may acquire signal information of a surrounding environment via a second antenna module in operation 707. In one embodiment, in operation 709, the processor 210 may track the position of the electronic device 200 by using the signal information acquired from the second antenna module.

As a result of operation 705, when the signal intensity indicating the state of the communication via the first antenna module is equal to or less than the threshold value, in operation 711, the processor 210 may communicate with the external device by using the first antenna module and the second antenna module together. In one embodiment, when the first antenna module and the second antenna module communicate with the external device, the processor 210 may track the position of the electronic device 200 by using a camera.

In one embodiment, the electronic device 200 may include multiple antenna modules, and may ensure necessary data throughput by using the multiple antenna modules. For example, if the state of communication through the first antenna module used for data communication is not sufficiently satisfactory, the electronic device 200 may perform data communication by using two or more antenna modules, thereby ensuring the data throughput required to maintain a VR or AR environment. Herein, the electronic device 200 may perform position tracking by using the remaining antenna modules, other than an antenna module allocated to data communication among the multiple antennas. Further, the electronic device 200 may complement the position tracking using the antenna module by performing position tracking using the camera. If all the antenna modules are allocated to data communication, the electronic device 200 may perform position tracking by using only the camera.

Figure 8B:
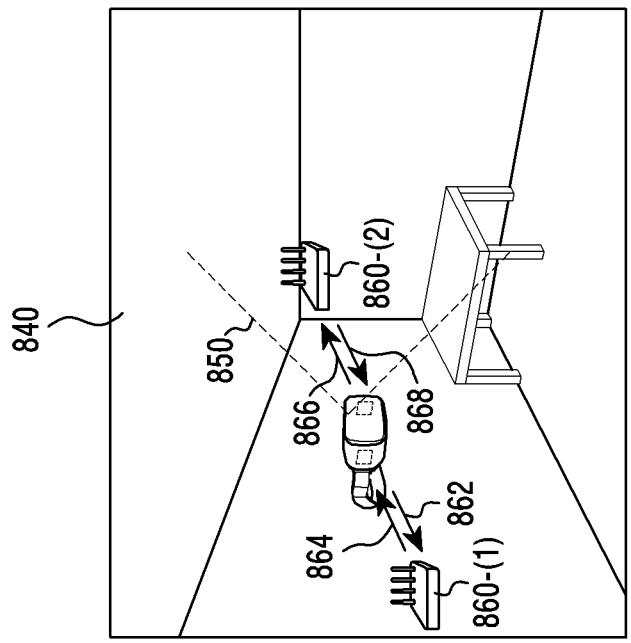
FIG. 8B illustrates a state in which an electronic device according to at least one embodiment tracks the position of the electronic device, based on a communication state in a usage environment.
Figure 8A:
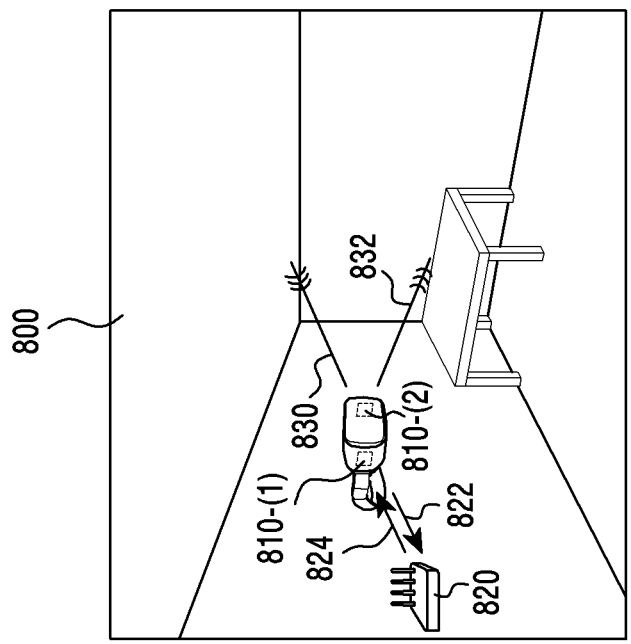
FIG. 8A illustrates a state in which an electronic device according to at least one embodiment, tracks the position of the electronic device, based on a communication state in a usage environment.

FIG. 8A illustrates a state in which an electronic device, according to one embodiment, tracks the position of the electronic device, based on a communication state in a usage environment; and FIG. 8B illustrates a state in which an electronic device, according to one embodiment, tracks the position of the electronic device, based on communication state in a usage environment.

FIG. 8A illustrates the state of tracking the position of an electronic device when a communication state in a usage environment is satisfactory.

Referring to FIG. 8A, a first antenna module 810-1 of an electronic device (e.g., the electronic device 200 in FIG. 2) may transmit (822) and receive (824) data to and from an external device by using a Wi-Fi signal received from an access point (AP) 820. In one embodiment, when the intensity of the Wi-Fi signal received from the access point 820 is higher than a threshold value, a processor (e.g., the processor 210 in FIG. 2) may track the position of the electronic device 200 by using a second antenna module 810-2. In one embodiment, the second antenna module 810-2 may emit a transmission signal 832 to a surrounding environment, may receive a reflected signal 830 reflected by the surrounding environment, and may then measure a distance by using a delay time or a decreased signal intensity between the transmission signal and the reflected signal.

FIG. 8B illustrates the state of tracking the position of an electronic device when a communication state in a usage environment is not satisfactory.

Referring to FIG. 8B, the first antenna module 810-1 of the electronic device 200 may receive (864) and transmit (862) data from and to an external device by using a Wi-Fi signal received from an access point 860-1. In one embodiment, when the intensity of the Wi-Fi signal received from the access point 860-1 is equal to or less than a threshold value, the processor 210 may communicate with the external device via the second antenna module 810-2. In one embodiment, the second antenna module 810-2 may receive a Wi-Fi signal from the access point 860-2, and may receive (868) and transmit (866) data from and to the external device. In one embodiment, the processor 210 may acquire image information 850 of a surrounding environment via a camera (not shown) to thereby track the position of the electronic device 200. In one embodiment, when the illuminance sensed by an illuminance sensor (e.g., the illuminance sensor 250 in FIG. 2) exceeds a predetermined threshold value, the processor 210 may acquire the image information 850 of the surrounding environment via the camera to thereby track the position of a user. In another embodiment, when the illuminance sensed by the illuminance sensor 250 is equal to or less than the threshold value, the processor 210 may acquire signal information via at least one of the first antenna module 810-1 and the second antenna module 810-2, which communicate with the external device, to thereby track the position of the user.

In one embodiment, when at least one mmWave antenna module includes only the first antenna module 810-1, the processor 210 may communicate with the external device via the first antenna module 810-1. In one embodiment, when the first antenna module 810-1 perform data communication with the external device, the processor 210 may acquire image information via the camera (not shown) to thereby perform position tracking. In one embodiment, when the first antenna module 810-1 does not perform data communication with the external device, the processor 210 may acquire signal information via the first antenna module to perform position tracking.

Figure 9:
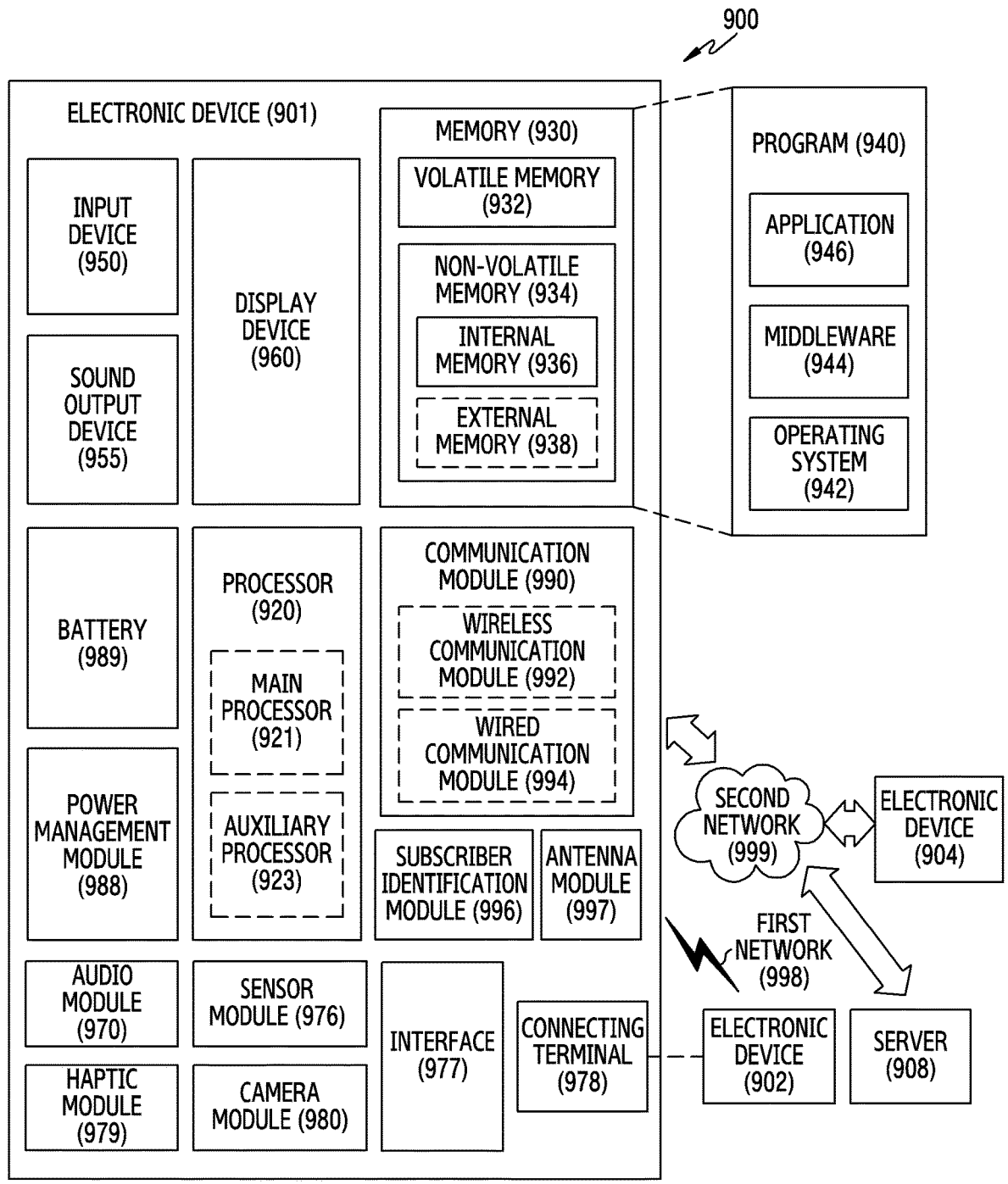
FIG. 9 illustrates a block diagram showing an electronic device in a network environment according to one embodiment.

FIG. 9 illustrates a block diagram showing an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally, or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. Regarding the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device wearable by a user, comprising:
a camera;
an illuminance sensor;
at least one mmWave antenna module configured to perform wireless communication by using an mmWave signal; and
at least one processor,
wherein the at least one processor is configured to:
sense an illuminance by using the illuminance sensor;
identify a state of the wireless communication with an external device;
acquire image information of a surrounding environment via the camera;
acquire signal information resulting from reflection of a signal emitted from the at least one mmWave antenna module by the surrounding environment; and
track a position of the electronic device of the user, based on at least one piece of information among the image information acquired via the camera and the signal information acquired via the at least one mmWave antenna module, according to the state of the wireless communication and the illuminance,
wherein the at least one mmWave antenna module comprises a first antenna module and a second antenna module,
wherein the at least one processor is configured to:
in response to the state of the wireless communication with the external device corresponding to a first state, acquire the signal information via the second antenna module to track the position; and
in response to the state of the wireless communication with the external device corresponding to a second state that does not correspond to the first state, communicate with the external device via the first antenna module and the second antenna module, and
wherein the at least one processor is further configured to:
in response to the state of the wireless communication with the external device corresponding to the second state and the illuminance sensed by the illuminance sensor exceeding a threshold value, acquire the image information via the camera to track the position; and
in response to the illuminance being equal to or less than the threshold value, acquire the signal information via the second antenna module to track the position.

2. The electronic device of claim 1,
wherein the at least one processor is configured to:
in response to the illuminance sensed by the illuminance sensor exceeding a threshold value, acquire the image information via the camera to track the position; and
in response to the illuminance being equal to or less than the threshold value, acquire the signal information via the at least one mmWave antenna module to track the position.

3. The electronic device of claim 1, wherein the at least one processor is further configured to:
track the position by using the camera in response to a number of feature points detected by the camera based on the image information exceeding a designated number; and
in response to the number of the feature points being equal to or less than the designated number, acquire the signal information via the at least one mmWave antenna module to track the position.

4. The electronic device of claim 1, wherein the at least one processor is configured to, in response to tracking the position by using the signal information acquired via the second antenna module, correct the position by using the image information acquired via the camera.

5. The electronic device of claim 1, wherein the at least one processor is further configured to:
in response to the state of the wireless communication with the external device corresponding to the second state and a number of feature points detected by the camera based on the image information exceeding a designated number, track the position via the camera; and
in response to the number of the feature points being less than the designated number, acquire the signal information via the at least one antenna module to track the position.

6. The electronic device of claim 1, wherein the at least one processor is configured to acquire the signal information via the at least one mmWave antenna module to track the position.

7. The electronic device of claim 1, further comprising a display, wherein the at least one processor is configured to display information about the tracking of the position of the user on the display.

8. An operation method of an electronic device wearable by a user, comprising:
sensing an illuminance by using an illuminance sensor;
identifying a state of a wireless communication with an external device;
acquiring image information of a surrounding environment via a camera;
acquiring, by at least one mmWave antenna module in the electronic device, signal information resulting from reflection of a signal emitted from the at least one mmWave antenna module by the surrounding environment; and
tracking a position of the electronic device of the user, based on at least one piece of information among the image information acquired via the camera and the signal information acquired via the at least one mmWave antenna module, according to the state of the wireless communication and the illuminance,
wherein the at least one mmWave antenna module comprises a first antenna module and a second antenna module,
wherein the operation method of the electronic device is further comprising:
in response to the state of the wireless communication with the external device corresponding to a first state, acquiring the signal information via the second antenna module to track the position; and
in response to the state of the wireless communication with the external device corresponding to a second state that does not correspond to the first state, communicating with the external device via the first antenna module and the second antenna module, and
wherein the operation method of the electronic device is further comprising:
in response to the state of the wireless communication with the external device corresponding to the second state and the illuminance sensed by the illuminance sensor exceeding a threshold value, acquiring the image information via the camera to track the position; and in response to the illuminance being equal to or less than the threshold value, acquiring the signal information via the second antenna module to track the position.

9. The method of claim 8, further comprising:

in response to the illuminance sensed by the illuminance sensor exceeding a threshold value, acquiring the image information via the camera to track the position; and in response to the illuminance being equal to or less than the threshold value, acquiring the signal information via the at least one mmWave antenna module to track the position.

10. The method of claim 8, further comprising:

tracking the position by using the camera in response to a number of feature points detected by the camera based on the image information exceeding a designated number; and in response to the number of the feature points being equal to or less than the designated number, acquiring the signal information via the at least one mmWave antenna module to track the position.

11. The method of claim 8, further comprising:

displaying information about the tracking of the position of the electronic device of the user on the display.

12. An electronic device wearable by a user, comprising:

a camera;

an illuminance sensor;

at least one mmWave antenna module configured to perform wireless communication by using an mmWave signal; and a lens part;

a projector configured to output data acquired via the at least one mmWave antenna module to the lens part, the output data being refracted through a prism and displayed on the lens part; and at least one processor, wherein the at least one processor is configured to:

sense an illuminance by using the illuminance sensor;

identify a state of the wireless communication with an external device;

acquire image information of a surrounding environment via the camera;

acquire signal information resulting from reflection of a signal emitted from the at least one mmWave antenna module by the surrounding environment; and track a position of the electronic device of the user, based on at least one piece of information among the image information acquired via the camera and the signal information acquired via the at least one mmWave antenna module, and the projector is configured to output an augmented image to the lens part, based on the position of the electronic device of the user and the acquired data, wherein the at least one mmWave antenna module comprises a first antenna module and a second antenna module, wherein the at least one processor is configured to:

in response to the state of the wireless communication with the external device corresponding to a first state, acquire the signal information via the second antenna module to track the position; and in response to the state of the wireless communication with the external device corresponding to a second state that does not correspond to the first state, communicate with the external device via the first antenna module and the second antenna module, and wherein the at least one processor is further configured to:

in response to the state of the wireless communication with the external device corresponding to the second state and the illuminance sensed by the illuminance sensor exceeding a threshold value, acquire the image information via the camera to track the position; and in response to the illuminance being equal to or less than the threshold value, acquire the signal information via the second antenna module to track the position.

13. The electronic device of claim 12, wherein the at least one processor is further configured to:

track the position by using the camera in response to a number of feature points detected by the camera based on the image information exceeding a designated number; and in response to the number of the feature points being equal to or less than the designated number, acquire the signal information via the at least one mmWave antenna module to track the position.

14. The electronic device of claim 12, further comprising:

a single mmWave antenna module as the at least one mmWave antenna module, wherein the at least one processor is further configured to:

in response to communication with the external device being performed via the single mmWave antenna module, acquire the image information via the camera to track the position; and in response to the communication with the external device not being performed, acquire the signal information via the single mmWave antenna module to track the position.

* * * * *